Figure 1:
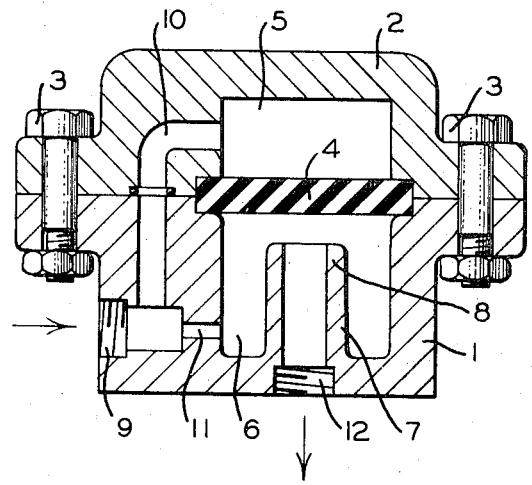

United States Patent [19]
Krieter

[11] 3,812,876
[45] May 28, 1974

[54] APPARATUS FOR CONTROLLING THE QUANTITY OF FLOW IN A FLUID MEDIUM

[75] Inventor: Horst Krieter, Ahlem, Germany

[73] Assignee: Westinghouse Bremsen-und Apparatebau, GmbH, Hannover, Germany

[22] Filed: Apr. 8, 1971

[21] Appl. No.: 132,382

[30] Foreign Application Priority Data
Apr. 23, 1970 Germany.............................. 2019651

[52] U.S. Cl.................................. 137/501, 137/271
[51] Int. Cl. ............................................. G05d 7/01
[58] Field of Search ........... 137/501, 269, 271, 500, 137/503, 525

[56] References Cited
UNITED STATES PATENTS
| | | | |
|---|---|---|---|
| 611,519 | 9/1888 | Simmance............................ | 137/501 |
| 1,272,212 | 7/1918 | Callan.................................. | 137/500 |

FOREIGN PATENTS OR APPLICATIONS
| | | | |
|---|---|---|---|
| 2,524 | 2/1891 | Great Britain ...................... | 137/501 |
| 26,615 | 5/1912 | Great Britain ...................... | 137/501 |
| 141,753 | 5/1935 | Germany ............................. | 137/501 |
| 158,241 | 3/1940 | Germany ............................. | 137/501 |
| 746,386 | 7/1944 | Germany ............................. | 137/501 |

Primary Examiner—Martin P. Schwadron
Assistant Examiner—Robert J. Miller
Attorney, Agent, or Firm—R. W. McIntire, Jr.

[57] ABSTRACT

A fluid flow regulator device including a resilient member subjected on one side to the actual pressure of fluid supplied at the inlet and on the other side to pressure of inlet fluid at a fixed reduced value, thereby establishing a pressure differential across the two sides of said resilient member for producing a distortion thereof into a fluid flow area between the inlet and the outlet for obstructing said area and establishing a flow rate of the fluid medium according to the pressure differential established.

3 Claims, 2 Drawing Figures

PATENTED MAY 28 1974

3,812,876

INVENTOR.
HORST KRIETER
BY Ralph W. McIntire, Jr.
ATTORNEY

APPARATUS FOR CONTROLLING THE QUANTITY OF FLOW IN A FLUID MEDIUM

BACKGROUND OF THE INVENTION

Some of the presently known flow regulator devices include a resilient member in the form of a rubber ring disposed in surrounding relation on a conically-shaped wall in the flow area of the fluid medium, said rubber ring being axially movable onto said conical wall to cause expansion thereof to a degree corresponding to a pressure differential acting on the ring and thereby controlling the flow rate of the fluid medium therepast. This arrangement is not wholly satisfactory in that the rubber ring is subjected to excessive wear, may possibly stick in a fixed position on the conical wall, and may take a permanent set after a long period of nonusage.

Other known flow regulators utilize a spring biased choke piston, the flow capacity of which is variable responsively to a pressure differential established by a choke of fixed flow capacity. This type of flow regulator requires close tolerance machining, and therefore is costly.

SUMMARY OF THE INVENTION

The object of the present invention is to provide a flow regulator device characterized by low cost of production and reliability of performance.

The object of the invention is obtained by providing a flow regulator device having a fluid medium inlet and outlet, and a resilient member subject on one side to the actual pressure of fluid medium as supplied to the inlet and on the opposite side to the pressure of said fluid medium after passing through a choke of fixed flow capacity, thereby establishing a pressure differential across the two sides of said resilient member to cause said member to be distorted into and accordingly constrict the flow area through which the fluid medium flows from the inlet to the outlet, the amount of constriction of said flow area being determined by the degree of said pressure differential. Accordingly, a variance of pressure of the fluid medium supplied at the inlet produces a corresponding change in the pressure differential across the resilient member and, consequently, a change in the flow rate through the flow area. The resilient member may be in the form of either a disc-type diaphragm member or a tubular member.

Figure 2:
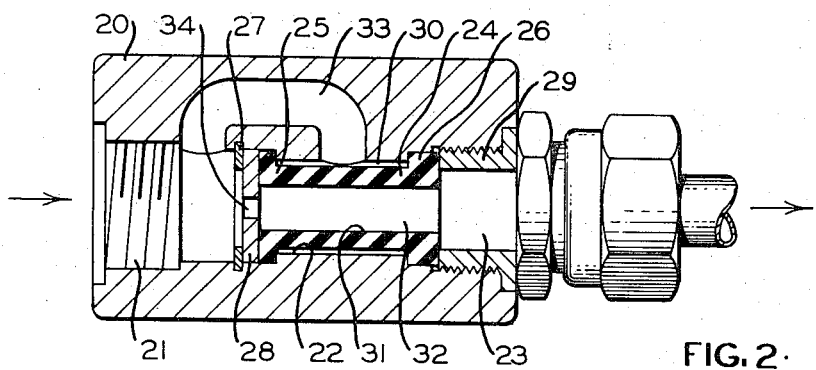

In the drawing,

FIG. 1 is a cross-sectional view of a flow regulator device employing a disc-type diaphragm as a resilient member; and FIG. 2 is a cross-sectional view of a flow regulator device employing a tubular element as the resilient member.

DESCRIPTION AND OPERATION

The flow regulator device, as shown in FIG. 1, comprises two complementary casing sections 1 and 2 secured together by such means as a plurality of bolts 3. A resilient disc-type diaphragm member 4 is sealingly clamped about its periphery between the two casing sections 1 and 2 and thereby cooperates with said casing sections to form, on opposite sides of said diaphragm, two chambers 5 and 6 hermetically isolated from each other. A hollow projection 7 coaxially disposed in chamber 6 has an annular opening 8 at the inner end thereof which is so positioned relative to the disc 4 as to provide a fluid flow area therebetween.

A fluid inlet 9 formed in casing section 2 is connected to chamber 5 by a passageway 10 formed cooperatively in both casing sections 1 and 2 and is connected to chamber 6 via a choke 11 of predetermined flow capacity. Inlet 9 communicates via choke 11 and chamber 6 with opening 8 and, therefore, with a delivery or outlet bore 12 extending through projection 7 with one end opening to the exterior of casing section 2 and the inner end forming said opening 8.

In operation of the flow regulator device shown in FIG. 1, fluid under pressure flows through inlet 9 in the direction indicated by the arrow whence said fluid flows to chamber 5 via passageway 10 and to chamber 6 via choke 11. Because of the restricted flow through choke 11, a pressure differential is established across the opposite sides of diaphragm 4 with the greater pressure prevailing on the side adjacent chamber 5.

The greater pressure prevailing on the side of diaphragm 4 adjacent chamber 5 causes deformation or distortion of said diaphragm toward the opening 8 of projection 7 in chamber 6, thereby reducing the flow space between said diaphragm and said opening and, consequently, effecting a corresponding reduction in fluid flow through outlet 12. It should be apparent that an increase or decrease in pressure of the fluid medium introduced at the inlet 9 produces a corresponding increase or decrease in the degree of pressure differential across diaphragm 4, and, therefore, a corresponding decrease or increase, respectively, in the amount of flow of said fluid medium to outlet 12.

The flow regulator device shown in FIG. 2 comprises a housing 20 having a bore extending coaxially therethrough, said bore comprising an inlet portion 21 disposed adjacent one end of said housing, an intermediate portion 22, and an outlet portion 23 disposed adjacent the other end of said housing with said intermediate portion formed therebetween and being of smaller diameter than said inlet and outlet portions so as to form respective shoulders adjacent thereto. The inlet 21 and outlet 23 may be provided with screw threads for making pipe connections thereto.

A flexible resilient tubular member 24 is coaxially disposed in the intermediate bore portion 22 and is provided at each end thereof with respective sealing flanges 25 and 26. Flange 25 abuts against the shoulder of bore portion 22 adjacent inlet 21 and is sealingly clamped thereagainst by a snap ring 27 with an annular orifice plate 28 secured between said snap ring and said flange. Flange 26 is sealingly clamped against the shoulder of bore portion 22 adjacent outlet 23 by the inner end of a pipe connection member 29 which is screwed into said outlet. When secured in position in the manner just described, tubular member 24 cooperates with housing 20 to form an outer annular chamber 30 disposed between the outer wall surface of said tubular member and the wall surface of intermediate bore portion 22. An inner wall surface 31 of tubular member 24 cooperates with the connection member 29 to define an internal space or chamber 32 hermetically isolated from the outer chamber 30.

Inlet 21 is connected to outer chamber 30 via a passageway 33 formed in housing 20 and to inner chamber 32 via a choke 34 formed in orifice plate 28. Inlet 21, choke 34, and inner chamber 32 are arranged in axially aligned relation to each other, said inner chamber 32 comprising the flow opening or area through which fluid medium flows from choke 34 to outlet 23.

In operation of the flow regulator device shown in FIG. 2, fluid under pressure flows through inlet 21 in the direction indicated by the arrow, thence through choke 34 into inner chamber 22 and via passageway 33 into outer chamber 30. Because of the restriction imposed on the flow into inner chamber 30 by choke 34, a pressure differential is established across the inner and outer surfaces of the flexible tubular member 24, with the greater pressure prevailing against the outer surface.

The greater pressure prevailing on the outer surface of tubular member 24 causes said tubular member to be squeezed radially inwardly toward its axis, thereby effecting a degree of constriction in the cross-sectional area thereof and, consequently, a corresponding reduction of fluid flow therethrough to the outlet 23. It should be apparent that, with choke 34 having a fixed flow capacity, an increase or decrease in pressure of the fluid medium introduced at inlet 21 produces a corresponding increase or decrease in the degree of pressure differential across the inner and outer surfaces of tubular member 24 and, therefore, a corresponding decrease or increase, respectively, in the amount of flow through said tubular member.

The flow function of the flow regulator device shown in FIG. 2 may be adjsted by interchanging the orifice plate 28 with other plates having chokes of different dimensions.

Since the flow regulator devices above described and embodying the invention herein disclosed have no parts movable relative to each other in a functional relationship, wear of the parts in the devices is virtually eliminated, and fine machining and honing of such parts is not critical in the construction of the devices. With elimination of wear in the parts of the flow regulator devices, sensitivity of function is greatly increased and, therefore, accuracy of operation is assured.

Having now described the invention, what I claim as new and desire to secure by Letters Patent, is:

1. A fluid regulator device comprising:
   a. a housing having an inlet and an outlet, and a fluid flow area therebetween through which a fluid medium may flow from the inlet to the outlet;
   b. first passage means connecting with said inlet and the fluid medium therein at the prevailing pressure;
   c. second passage means connecting with said inlet;
   d. a resilient tubular member whose inner surface defines an internal space comprising said flow area and whose opposite ends are sealingly secured in said housing adjacent said inlet and said outlet, respectively,
   e. said tubular member having the outer surface thereof in communication with said first passage means and subject to the prevailing pressure therein, and the inner surface thereof in communication with said second passage means for subjecting said inner surface to the fluid medium at a reduced pressure and establishing a pressure differential across the inner and outer surfaces of said tubular member and effecting consequent distortion thereof into said flow area for controlling flow of fluid medium therethrough accordingly.

2. A fluid flow regulator device, as set forth in claim 1, further characterized by choke means interposed in said second passage means.

3. A fluid flow regulator device, as set forth in claim 2, wherein said choke means comprises a plate member having an orifice of preselected flow capacity formed therein, said plate being interchangeable with another plate member having an orifice of different flow capacity.

* * * * *